United States Patent [19]

Le-Khac

[11] Patent Number: 6,018,017
[45] Date of Patent: Jan. 25, 2000

[54] HIGHLY ACTIVE DOUBLE METAL CYANIDE CATALYSTS

[75] Inventor: Bi Le-Khac, West Chester, Pa.

[73] Assignee: Arco Chemical Technology, L.P., Greenville, Del.

[21] Appl. No.: 08/947,253

[22] Filed: Oct. 8, 1997

Related U.S. Application Data

[62] Division of application No. 08/435,116, May 15, 1995, Pat. No. 5,712,216.

[51] Int. Cl.⁷ ..................................... C08G 65/04
[52] U.S. Cl. ........................... 528/421; 502/175; 502/200
[58] Field of Search ............................ 528/421; 502/175, 502/200

[56] References Cited

U.S. PATENT DOCUMENTS

| | | | |
|---|---|---|---|
| 5,068,304 | 11/1991 | Higuchi et al. | 528/31 |
| 5,136,010 | 8/1992 | Reisch et al. | 528/77 |
| 5,185,420 | 2/1993 | Smith et al. | 528/76 |
| 5,300,535 | 4/1994 | Takeyasu et al. | 521/137 |
| 5,470,813 | 11/1995 | Le-Khac | 502/175 |
| 5,482,908 | 1/1996 | Le-Khac | 502/156 |
| 5,668,191 | 9/1997 | Kinkelaar et al. | 521/174 |
| 5,728,745 | 3/1998 | Allen et al. | 528/77 |
| 5,767,324 | 6/1998 | Chaffanjon et al. | 568/621 |

*Primary Examiner*—Robert Dawson
*Assistant Examiner*—D. Aylward
*Attorney, Agent, or Firm*—Jonathan L. Schuchardt

[57] ABSTRACT

Improved double metal cyanide catalysts are disclosed. The substantially amorphous catalysts of the invention are more active for polymerizing epoxides than conventional DMC catalysts, which have a substantial crystalline component. Polyol products made with the catalysts are unusually clear, have exceptionally low unsaturations, and contain no detectable amount of low molecular weight polyol impurities. Methods of making the improved DMC catalysts are also disclosed. In one method, the reactants are intimately combined to produce a catalyst of the invention. In another method, an organic complexing agent is initially present in the reactant solutions.

4 Claims, 10 Drawing Sheets

FIG-10

HIGHLY ACTIVE DOUBLE METAL CYANIDE CATALYSTS

This is a division of appl. Ser. No. 08/435,116, filed May 15, 1995, now U.S. Pat. No. 5,712,216.

FIELD OF THE INVENTION

The invention relates to double metal cyanide (DMC) complex catalyst compositions. The catalysts are highly active in epoxide polymerizations. The invention includes improved methods for preparing the compositions. Polyether polyol products made using the catalyst compositions have exceptionally low unsaturations.

BACKGROUND OF THE INVENTION

Double metal cyanide complex compounds are well known catalysts for epoxide polymerization. The catalysts are highly active, and give polyether polyols that have low unsaturation compared with similar polyols made using basic (KOH) catalysis. Conventional DMC catalysts are prepared by reacting aqueous solutions of metal salts and metal cyanide salts to form a precipitate of the DMC compound. The catalysts can be used to make a variety of polymer products, including polyether, polyester, and polyetherester polyols. Many of the polyols are useful in various polyurethane coatings, elastomers, sealants, foams, and adhesives.

Conventional DMC catalysts are usually prepared in the presence of a low molecular weight complexing agent, typically an ether such as glyme (dimethoxyethane) or diglyme. The ether complexes with the DMC compound, and favorably impacts the activity of the catalyst for epoxide polymerization. In one conventional preparation, aqueous solutions of zinc chloride (excess) and potassium hexacyanocobaltate are combined by simple mixing. The resulting precipitate of zinc hexacyanocobaltate is then mixed with aqueous glyme. An active catalyst is obtained that has the formula:

$Zn_3[Co(CN)_6]_2 \cdot xZnCl_2 \cdot yH_2O \cdot zGlyme$

Other known complexing agents include alcohols, ketones, esters, amides, ureas, and the like. (See, for example, U.S. Pat. Nos. 3,427,256, 3,427,334, 3,278,459, and Japanese Pat. Appl. Kokai Nos. 4-145123, 3-281529 and 3-149222). Generally, the catalyst made with glyme has been the catalyst of choice. The catalysts have relatively high surface areas, typically within the range of about 50–200 $m^2/g$.

Normally, the complexing agent is added to the reaction mixture following precipitation of the DMC compound. Some references, such as U.S. Pat. No. 5,158,922, indicate that the complexing agent can be included with either or both of the aqueous reactant solutions, but no reference teaches any particular advantage of having the complexing agent present in the reactant solutions.

Figure 4:
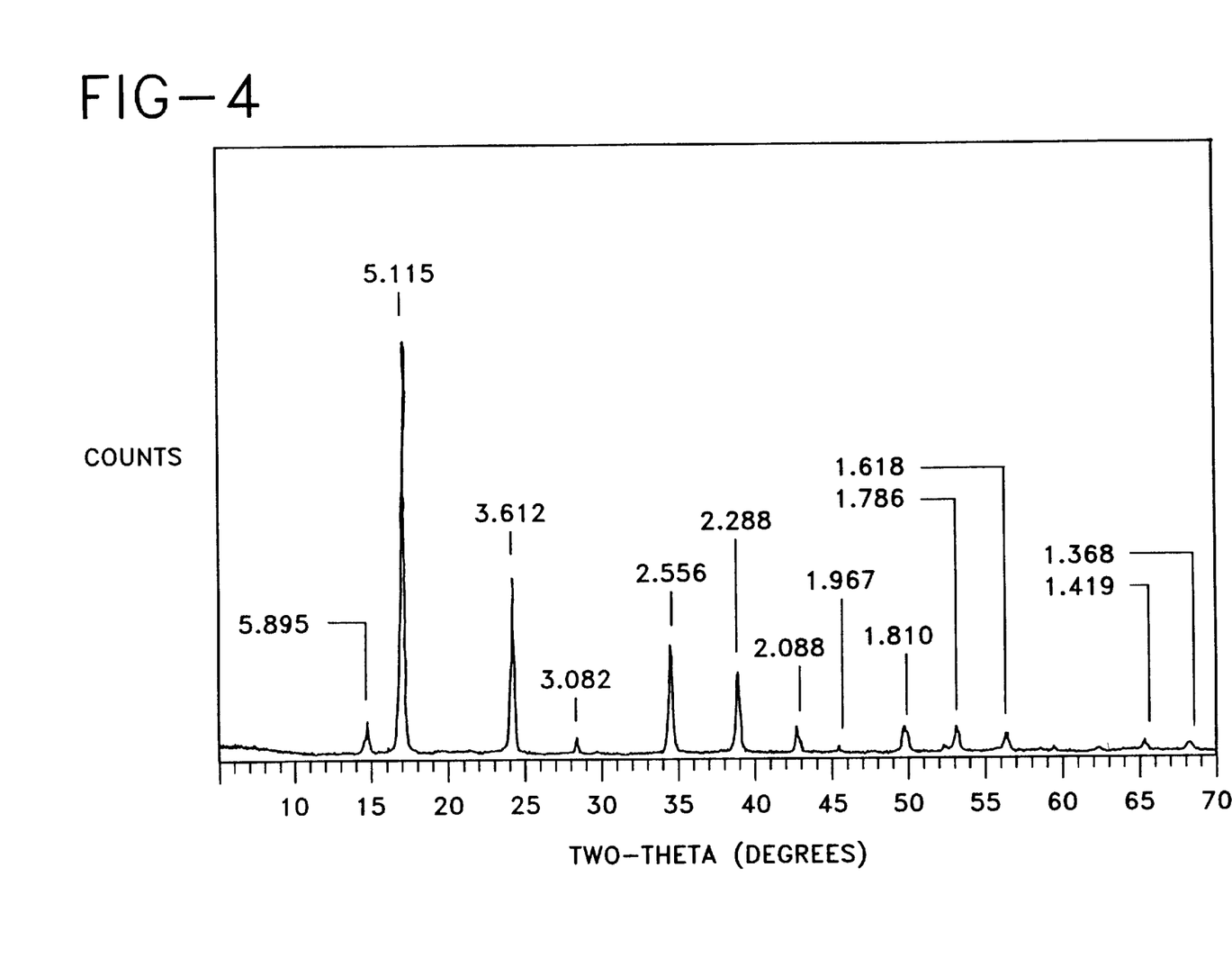

Double metal cyanide compounds prepared in the absence of a complexing agent are highly crystalline by X-ray diffraction analysis (See FIG. 4), and are inactive for epoxide polymerization. When the complexing agents described above are used, the resulting catalysts actively polymerize epoxides. Our X-ray diffraction analyses of active DMC complexes prepared according to methods known in the art suggest that conventional DMC catalysts are actually mixtures of a highly crystalline DMC compound and a more amorphous component. Typically, conventional DMC catalysts—which are generally prepared by simple mixing—contain at least about 35 wt. % of highly crystalline DMC compound. DMC compounds useful as epoxide polymerization catalysts and containing less than about 30 wt. % of highly crystalline DMC compound are not known.

Double metal cyanide catalysts generally have good activity for epoxide polymerizations, often much greater than conventional basic catalysts. However, because the DMC catalysts are rather expensive, catalysts with improved activity are desirable because reduced catalyst levels could be used.

Double metal cyanide catalysts normally require an "induction" period. In contrast to basic catalysts, DMC catalysts ordinarily will not begin polymerizing epoxides immediately following exposure of epoxide and starter polyol to the catalyst. Instead, the catalyst needs to be activated with a small proportion of epoxide before it becomes safe to begin continuously adding the remaining epoxide. Induction periods of an hour or more are typical yet costly in terms of increased cycle times in a polyol production facility. Reduction or elimination of the induction period is desirable.

An advantage of DMC catalysts is that they permit the synthesis of high molecular weight polyether polyols having relatively low unsaturation. The adverse impact of polyol unsaturation on polyurethane properties is well documented. (See, for example, C. P. Smith et al., *J. Elast. Plast.*, 24 (1992) 306, and R. L. Mascioli, *SPI Proceedings, 32nd Annual Polyurethane Tech./Market. Conf.* (1989) 139.) When a DMC catalyst is used, polyols having unsaturations as low as about 0.015 meq/g can be made. Polyether polyols with even lower unsaturations can be made if a solvent such as tetrahydrofuran is used to make the polyol. See, for example, U.S. Pat. Nos. 3,829,505 and 4,843,054. However, for commercial polyol production, the use of a solvent is not particularly desirable. Thus, other ways to further reduce polyol unsaturation are needed.

When conventional DMC catalysts are used to polymerize epoxides, the polyether polyol products contain relatively low levels (about 5–10 wt. %) of low molecular weight polyol impurities. A way to eliminate these polyol impurities is desirable because improved polyurethanes could result from the use of more monodisperse polyols.

Double metal cyanide complex catalyst residues are often difficult to remove from polyether polyols, and a wide variety of methods have been developed to cope with the problem. Removal of DMC catalyst residues from the polyols promotes long-term storage stability and consistent polyol performance in urethane formulation. Most methods involve some kind of chemical treatment of the polyol following polymerization. There has been little progress made in developing catalyst preparation methods that ultimately facilitate catalyst removal from the polyol products.

SUMMARY OF THE INVENTION

The invention is an improved catalyst for polymerizing epoxides. We have surprisingly found that substantially amorphous DMC complexes are much more active than conventional DMC complexes for epoxide polymerization. In addition, the amorphous complexes are more quickly activated (show reduced induction periods) compared with conventional DMC catalysts.

The catalysts of the invention comprise at least about 70 wt. % of a substantially amorphous DMC complex; more preferred compositions comprise from about 90–99 wt. % of the substantially amorphous DMC complex. The more preferred compositions exhibit a powder x-ray diffraction pattern having substantially no sharp lines at about 5.1 (d-spacings, angstroms).

The invention also includes compositions which comprise the substantially amorphous DMC complexes described above, and up to about 30 wt. % of a highly crystalline DMC compound; more preferred compositions contain less than about 1 wt. % of the highly crystalline DMC compound.

The invention includes methods for preparing the improved catalysts. Although conventional methods for making DMC complex catalysts have been known for about 30 years, no one has previously appreciated that the method of combining the reactants is extremely important. We have now discovered, quite surprisingly, that the way of combining the reactants, and particularly the way in which the organic complexing agent is introduced into the DMC complex, is extremely important. One way to make the highly active, substantially amorphous DMC complexes of the invention is to intimately combine the reactants during preparation by homogenization or high-shear mixing. Aqueous solutions of a water-soluble metal salt and a water-soluble metal cyanide salt are intimately combined in the presence of a complexing agent to produce an aqueous mixture containing the DMC complex catalyst. The catalyst, which is then isolated and dried, comprises at least about 70 wt. % of a substantially amorphous DMC complex.

In a second method, the organic complexing agent, preferably tert-butyl alcohol, is added to one or both of the aqueous reactant solutions before they are combined to produce the DMC complex. This method avoids the need to intimately combine the reactants by homogenization or high-shear mixing.

The invention also includes a method for preparing an epoxide polymer. The method comprises polymerizing an epoxide in the presence of a catalyst which comprises at least about 70 wt. % of a substantially amorphous DMC complex.

The invention also includes polyether polyol compositions that are uniquely available from using the catalysts of the invention. The polyols have exceptionally low unsaturations and contain unusually low levels of low molecular weight polyol impurities.

Finally, the invention includes a method for improving the filterability of a DMC complex catalyst from a polyether polyol product following epoxide polymerization. The method comprises using, as a polymerization catalyst, a substantially amorphous DMC complex catalyst of the invention.

DETAILED DESCRIPTION OF THE INVENTION

The catalysts of the invention, unlike conventional DMC compounds known in the art as useful for epoxide polymerization, comprise at least about 70 wt. % of a substantially amorphous DMC complex. More preferred catalysts of the invention comprise at least about 90 wt. % of a substantially amorphous DMC complex; most preferred are catalysts comprising at least about 99 wt. % of a substantially amorphous DMC complex.

Figure 2:
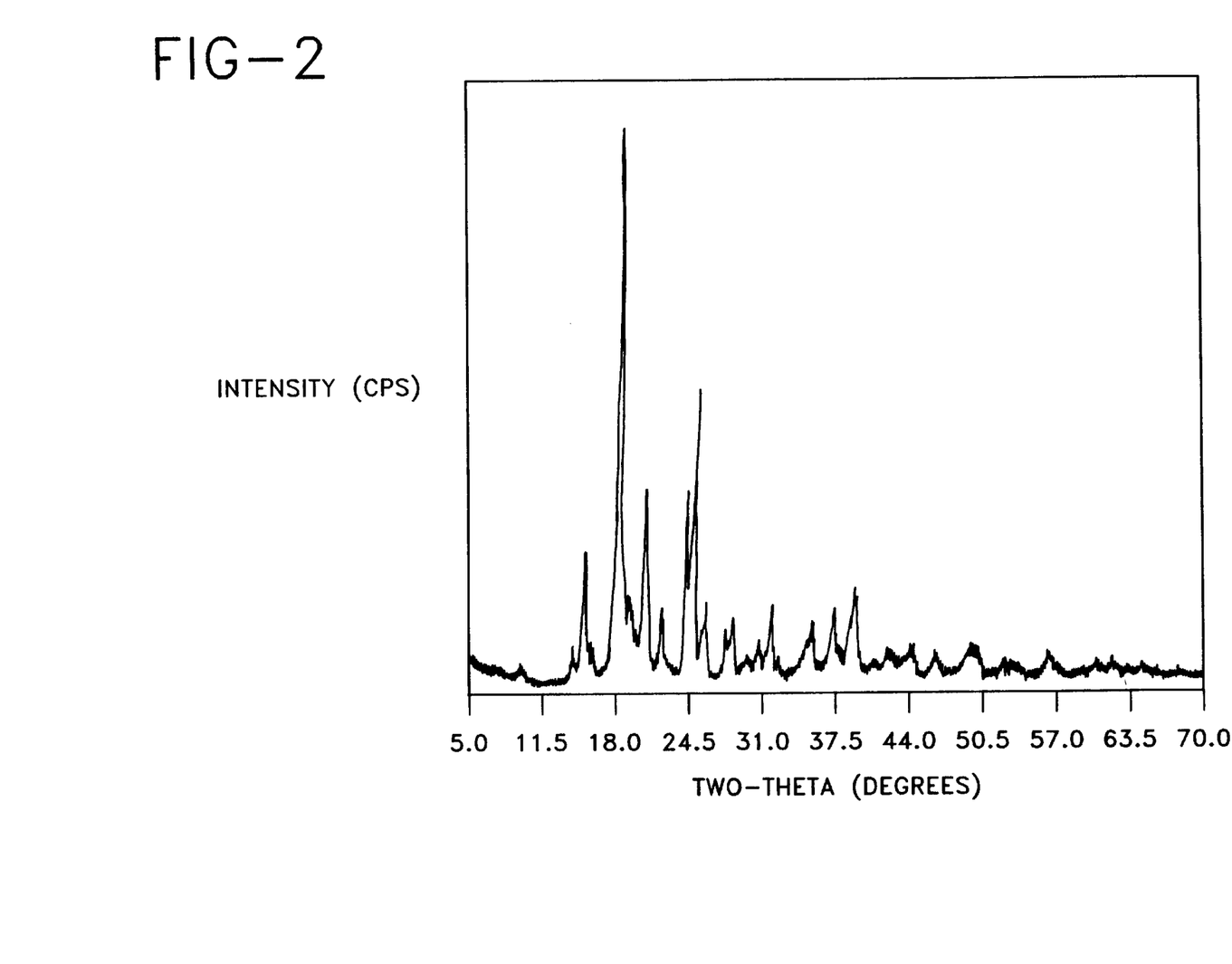
FIGS. 2–10 are powder x-ray diffraction patterns of various double metal cyanide compounds. These are described more fully below.

As defined in this application, "substantially amorphous" means substantially noncrystalline, lacking a well-defined crystal structure, or characterized by the substantial absence of sharp lines in the X-ray diffraction pattern of the composition. Powder X-ray diffraction (XRD) patterns of conventional double metal cyanide catalysts show characteristic sharp lines that correspond to the presence of a substantial proportion of a highly crystalline DMC component (see FIGS. 2 and 3). Highly crystalline zinc hexacyanocobaltate prepared in the absence of an organic complexing agent, which does not actively polymerize epoxides, shows a characteristic XRD fingerprint of sharp lines at d-spacings of about 5.07, 3.59, 2.54, and 2.28 angstroms (see FIG. 4).

Figure 3:
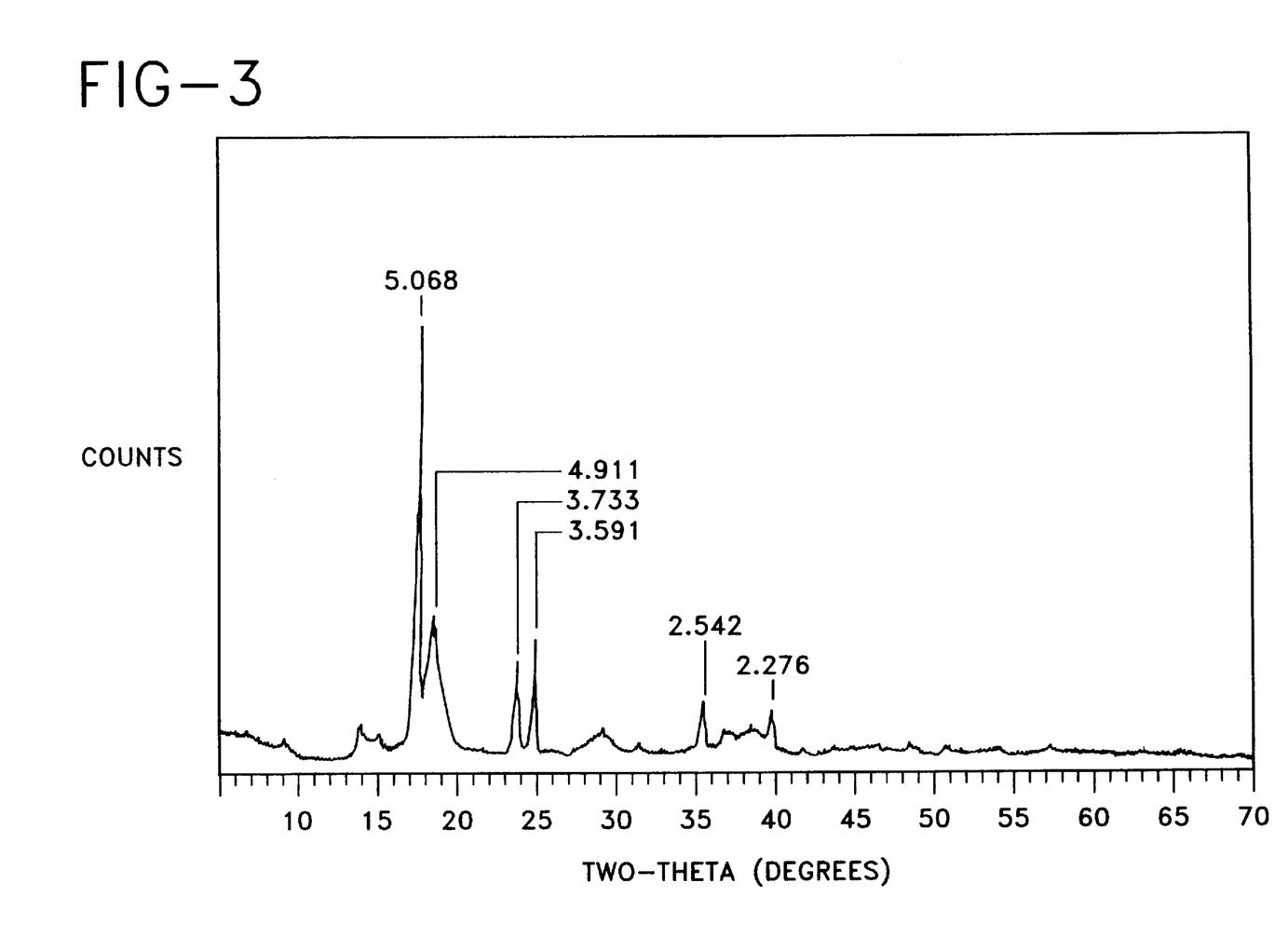

When a DMC catalyst is made in the presence of an organic complexing agent according to conventional methods, the XRD pattern shows lines for the highly crystalline material in addition to broader signals from relatively amorphous material, suggesting that conventional DMC epoxidation catalysts are actually mixtures of highly crystalline DMC compound and a more amorphous component (see FIG. 3). Typically, conventional DMC catalysts, which are generally prepared by simple mixing, contain at least about 35 wt. % of highly crystalline DMC compound.

Figure 5:
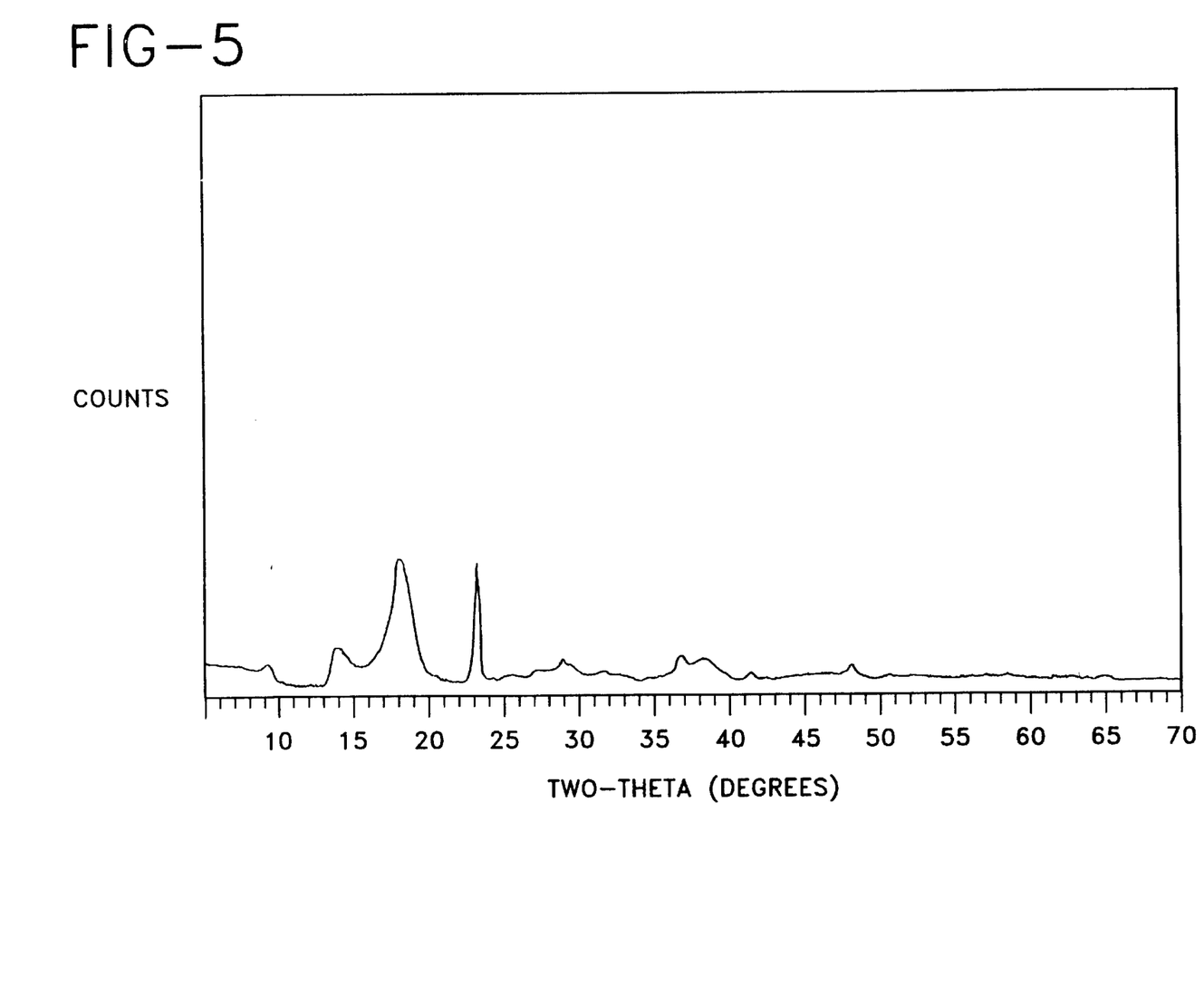
Figure 6:
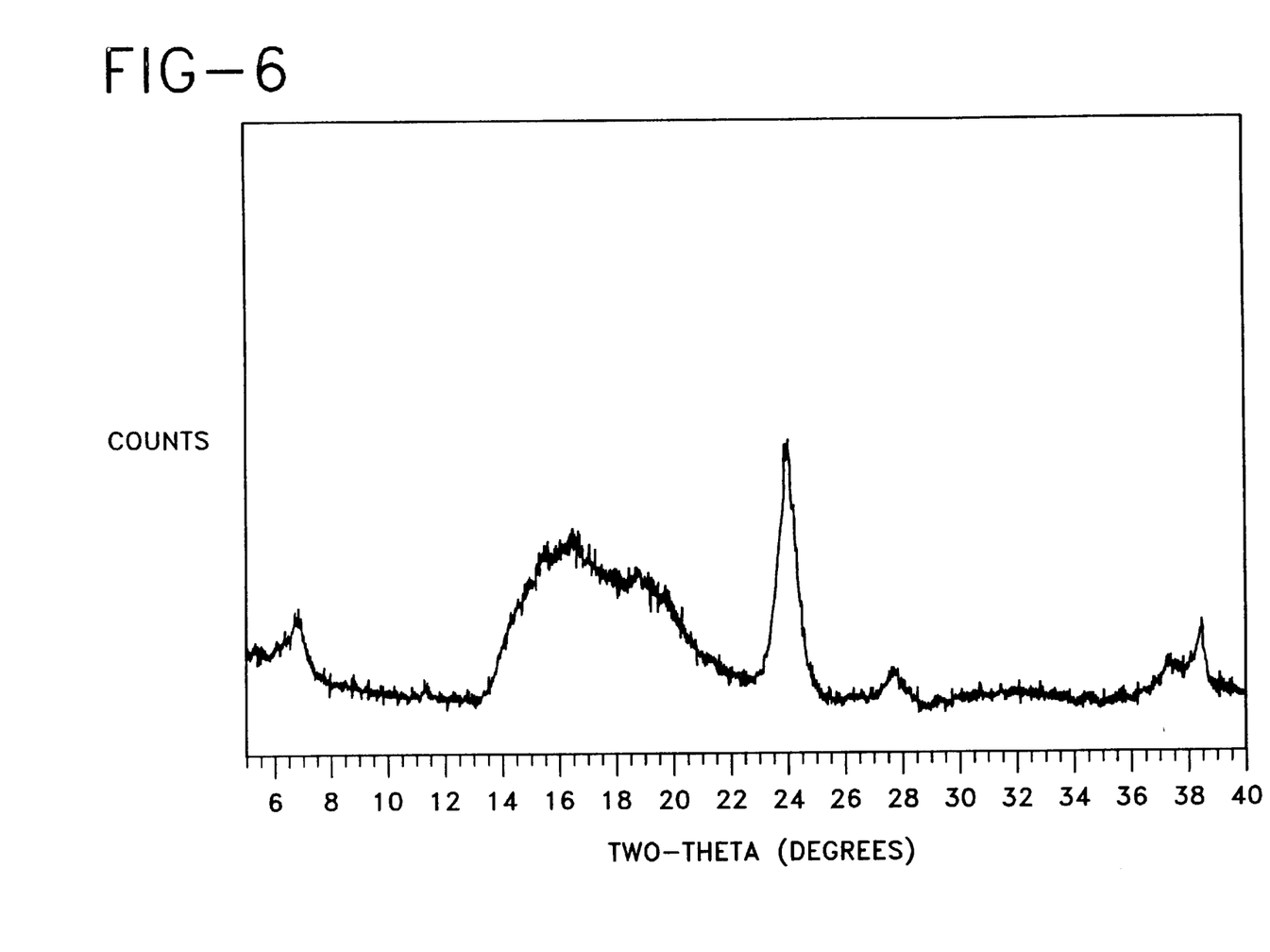

The catalysts of the invention are distinguishable from conventional DMC compositions based on their substantial lack of crystalline material. The substantial lack of crystallinity is evidenced by an XRD pattern showing that little or no highly crystalline DMC compound is present. When a zinc hexacyanocobaltate catalyst is prepared according to the method of the invention using tert-butyl alcohol as a complexing agent, for example, the X-ray diffraction pattern shows essentially no lines for crystalline zinc hexacyanocobaltate (5.07, 3.59, 2.54, 2.28 angstroms), but instead has only two major lines, both relatively broad, at d-spacings of about 4.82 and 3.76 angstroms (see FIG. 5). A similar pattern is observed when the method of the invention is used with glyme as a complexing agent (see FIG. 6).

Figure 7:
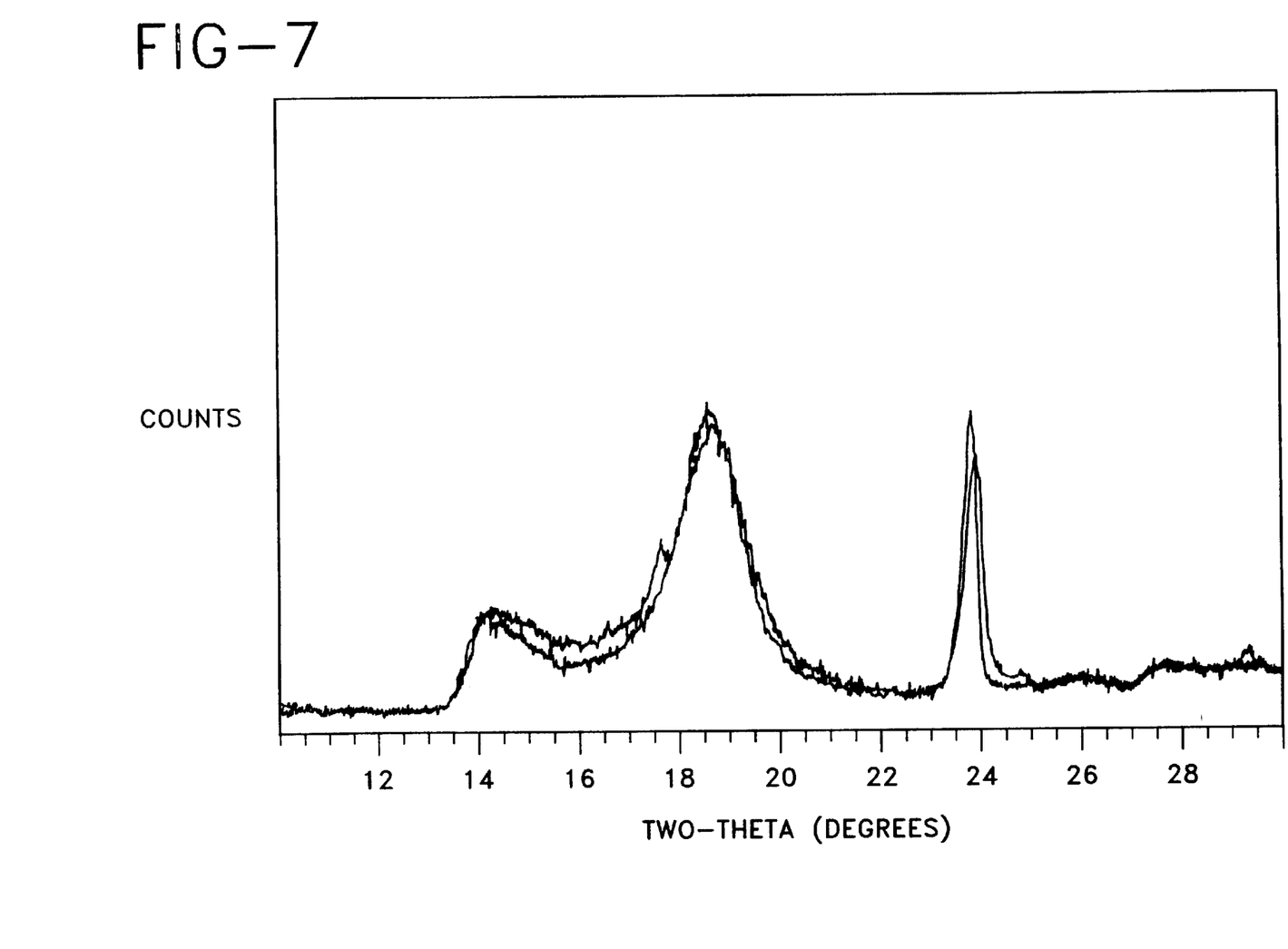
Figure 8:
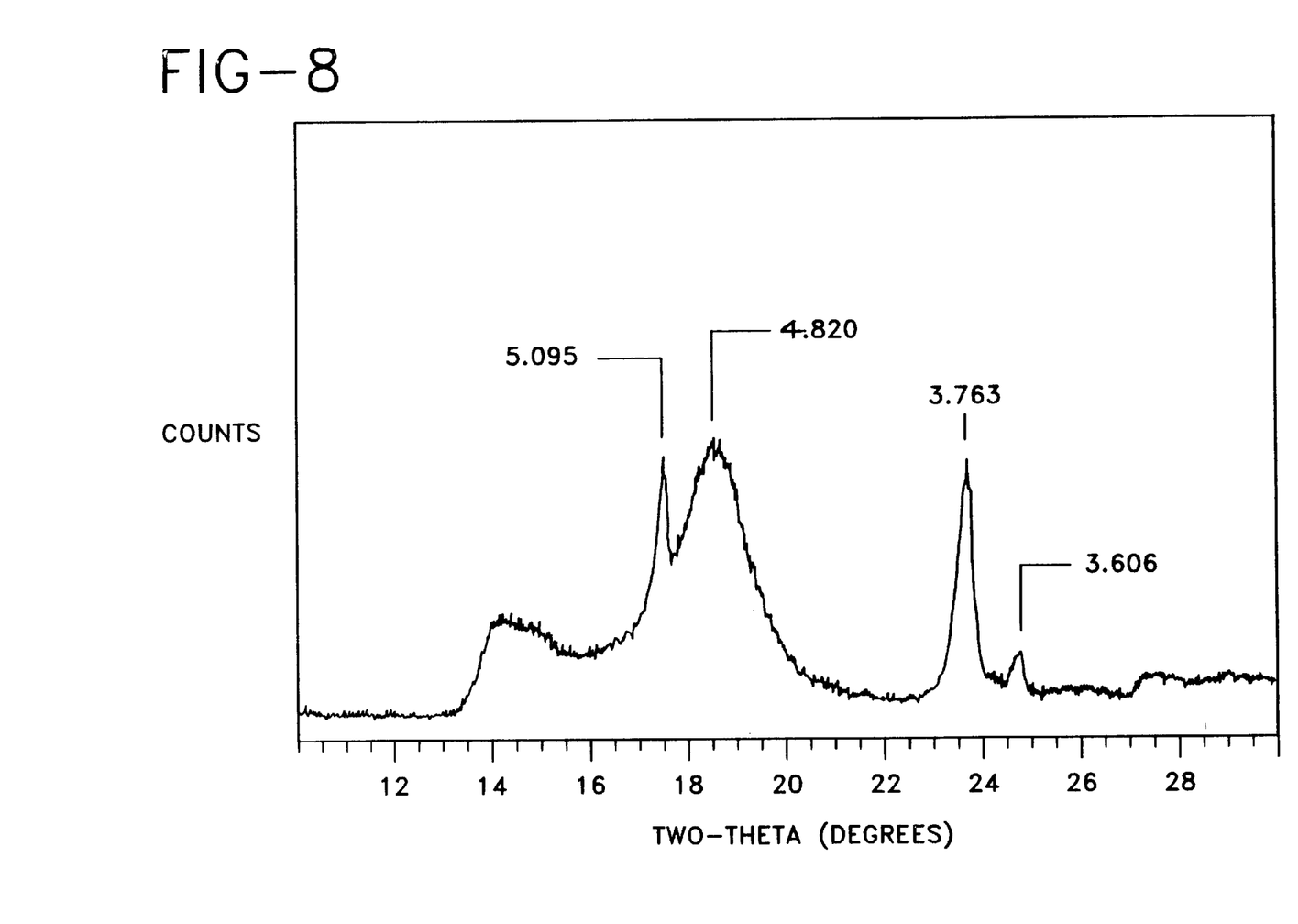
Figure 9:
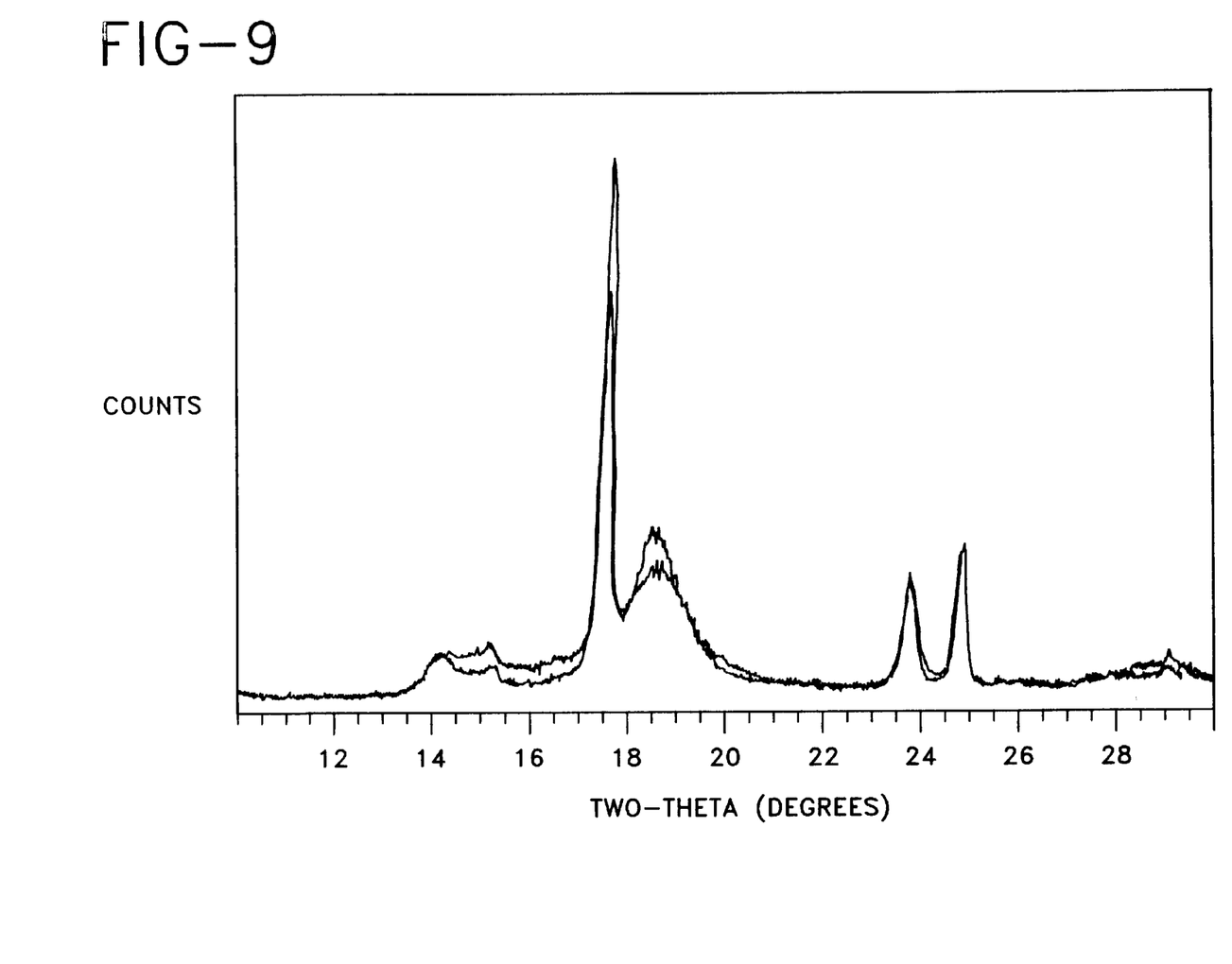
Figure 10:
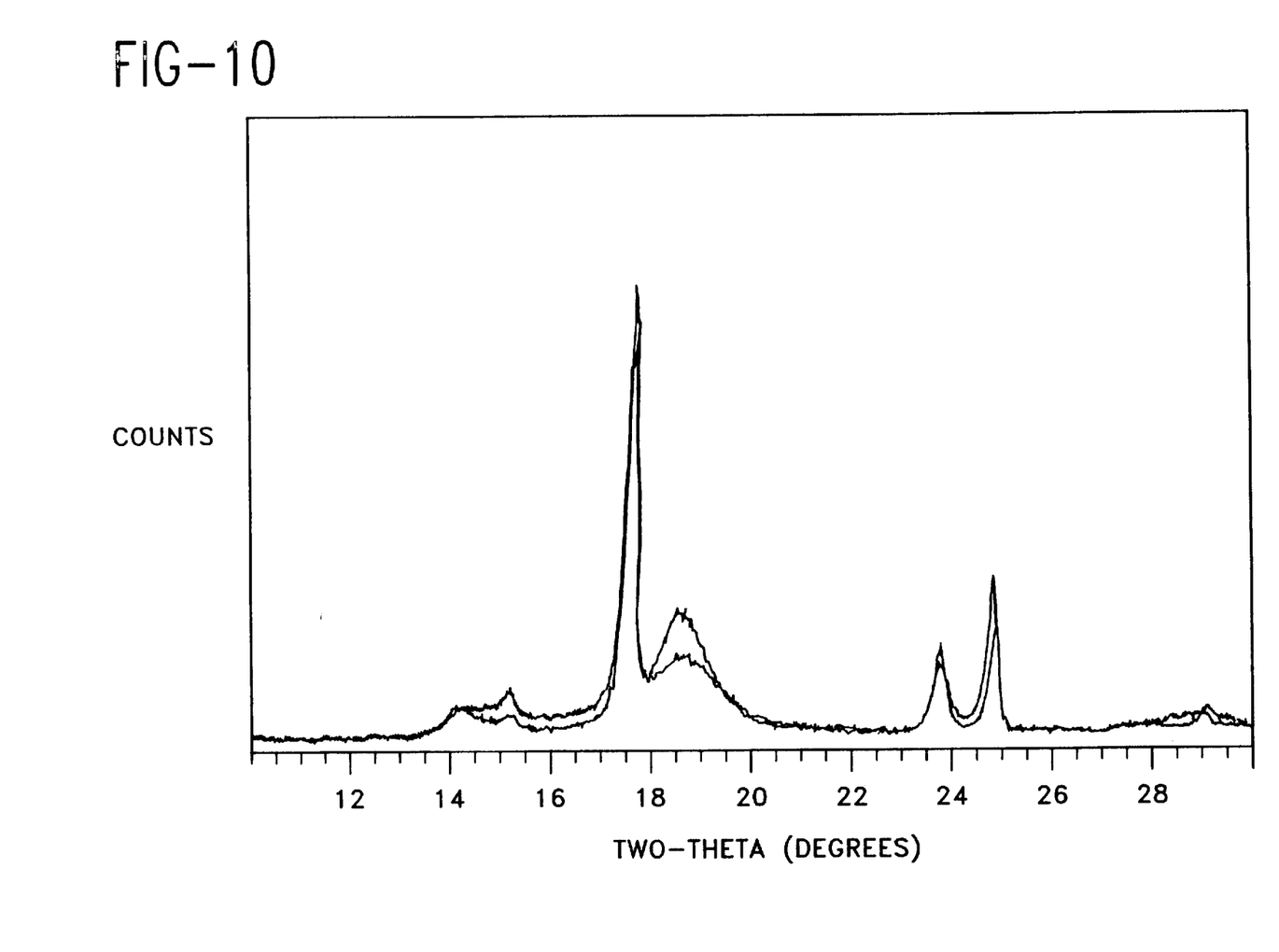

Spiking experiments demonstrate that DMC catalysts prepared by the method of the invention typically contain less than about 1 wt. % of highly crystalline DMC compound. (See FIG. 7, which shows that even 1 wt. % of highly crystalline DMC compound can be detected by X-ray analysis when spiked into a sample of a substantially amorphous catalyst of the invention). FIG. 8 shows a mixture that contains a substantially amorphous DMC catalyst spiked with 5 wt. % of highly crystalline DMC compound. FIG. 9 shows a mixture that contains a substantially amorphous DMC catalyst spiked with 25 wt. % of highly crystalline DMC compound. (Such a catalyst falls within the scope of the invention, which contains at least 70 wt. % of a substantially amorphous DMC catalyst.) Finally, FIG. 10 shows that the X-ray pattern for a substantially amorphous catalyst of the invention, when spiked with 40 wt. % of highly crystalline DMC compound, closely resembles the pattern observed for a DMC catalyst made by a conventional catalyst preparation. Some of the X-ray results are summarized in Table 1.

Conventional DMC catalysts typically contain at least about 35 wt. % of highly crystalline DMC compound. No one has previously recognized the desirability of preparing substantially amorphous catalysts, and the potential value of reducing the content of highly crystalline DMC compounds in these catalysts. It appears, based on our results, that the highly crystalline DMC compound acts as either a diluent or as a poison for the more active amorphous form of the catalyst, and its presence is preferably minimized or eliminated.

The invention includes compositions which comprise at least about 70 wt. % of the substantially amorphous DMC complex catalysts of the invention and up to about 30 wt. % of a highly crystalline DMC compound. More preferred compositions of the invention comprise at least about 90 wt. % of the substantially amorphous DMC complex catalyst and up to about 10 wt. % of the highly crystalline DMC compound. Most preferred are compositions that contain at least about 99 wt. % of the substantially amorphous DMC complex catalyst and up to about 1 wt. % of the highly crystalline material.

The catalyst compositions of the invention have relatively low surface areas. Conventional DMC compounds have surface areas within the range of about 50 to about 200 $m^2/g$. In contrast, the surface areas of the catalysts of the invention are preferably less than about 30 $m^2/g$. More preferred compositions have surface areas less than about 20 $m^2/g$.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel (II) nitrate, and the like, and mixtures thereof.

The water-soluble metal cyanide salts used to make the double metal cyanide compounds useful in the invention preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, the teachings of which are incorporated herein by reference.

The catalyst compositions of the invention are prepared in the presence of a complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. As is explained elsewhere in this application, the manner in which the complexing agent is introduced into the DMC complex can be extremely important. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

The conventional method of preparing DMC compounds useful for epoxide polymerization is fully described in many references, including U.S. Pat. Nos. 5,158,922, 4,843,054, 4,477,589, 3,427,335, 3,427,334, 3,427,256, 3,278,457, and 3,941,849, and Japanese Pat. Appl. Kokai No. 4-145123. The teachings of these references related to conventional catalyst preparation and suitable DMC compounds are incorporated herein by reference in their entirety.

The invention includes methods for making substantially amorphous DMC catalyst compositions of the invention. One method comprises two steps. First, aqueous solutions of a water-soluble metal salt and a water-soluble metal cyanide salt (the "reactant solutions") are intimately combined and reacted in the presence of a complexing agent to produce an aqueous mixture that contains a precipitated DMC complex catalyst. Second, the catalyst is isolated and dried. The complexing agent can be included with either or both of the aqueous salt solutions, or it can be added to the DMC compound immediately following precipitation of the catalyst. It is preferred to pre-mix the complexing agent with either the water-soluble metal cyanide salt, or with the water-soluble metal salt, or both, before intimately combining the reactants. The resulting catalyst composition is substantially amorphous, as is evidenced by the substantial absence of highly crystalline DMC compound by X-ray diffraction analysis.

We surprisingly discovered that achieving an intimate combination of the reactants is important for preparing catalysts having low crystallinity. In conventional methods, the water-soluble metal salt and the water-soluble metal cyanide salt are combined in aqueous media and are simply mixed together, typically with magnetic or mechanical stirring. The organic complexing agent is then added. This method of preparation results in catalysts having a substantial amount of highly crystalline DMC component, typically greater than about 35 wt. %. We found that combining the reactants in a manner effective to achieve an intimate combination of the reactants results in substantially amorphous catalysts that are exceptionally useful for epoxide polymerization. Suitable methods of achieving this intimate combination of reactants include homogenization, impingement mixing, high-shear stirring, and the like. When the reactants are homogenized, for example, the amount of highly crystalline material in the catalyst composition is minimized or eliminated, and is much lower than the amount of highly crystalline material present in a catalyst made by simple mixing. Examples 1 and 2 show how to make a catalyst by the first method.

A second method of the invention is also effective in producing a substantially amorphous DMC complex. In this method, the organic complexing agent is added to one or both of the aqueous reactant solutions before they are combined to produce the DMC complex. This method guarantees that the complexing agent will be available during the formation of the DMC compound. Preferably, the organic complexing agent is tert-butyl alcohol. Although the reactant solutions can be intimately combined by homogenization or high-shear mixing as described above, we found that this method gives a substantially amorphous DMC complex of the invention without the need for intense mixing of the reactants. Examples 8–11 show how to make a catalyst of the invention by the second method.

To summarize, substantially amorphous DMC catalysts of the invention can be made by two general methods. In one method, the reactant solutions are intimately combined by homogenization, high-shear mixing, or the like. Intimate combination is needed if the organic complexing agent is added following precipitation of the DMC compound. A second method of making substantially amorphous DMC catalysts avoids the need for intimate combination of the reactants. In this method, the complexing agent is present in one or both of the reactant solutions before they are combined to produce the DMC compound.

With either of the two methods of the invention described above, the order of addition of reagents (metal salt solution to metal cyanide salt solution, or vice versa) is not critical. Either method gives a substantially amorphous DMC compound with either order of addition of the reactants.

We surprisingly found, however, that when the second method is used (i.e., when the organic complexing agent is present in one or both of the reactant solutions before they are combined), a much more active catalyst results if the metal cyanide salt solution is added to the metal salt solution. See Examples 13–14 below. Thus, when the second method of preparing the catalyst is used, it is preferred to add the metal cyanide salt solution to the metal salt solution.

The invention includes a process for making an epoxide polymer. This process comprises polymerizing an epoxide in the presence of a double metal cyanide catalyst composition of the invention. Preferred epoxides are ethylene oxide, propylene oxide, butene oxides, styrene oxide, and the like, and mixtures thereof. The process can be used to make random or block copolymers. The epoxide polymer can be, for example, a polyether polyol derived from the polymerization of an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes (as taught in U.S. Pat. Nos. 3,278,457 and 3,404,109) to give polyethers, or with anhydrides (as taught in U.S. Pat. Nos. 5,145,883 and 3,538,043) to give polyester or polyetherester polyols. The preparation of polyether, polyester, and polyetherester polyols using double metal cyanide catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, *SPI Proceedings, 32nd Annual Polyurethane Tech./Market. Conf.* (1989) 360. The teachings of these U.S. patents related to polyol synthesis using DMC catalysts are incorporated herein by reference in their entirety.

The substantially amorphous DMC catalysts of the invention are highly active compared to conventional DMC catalysts (see Table 2). For example, a zinc hexacyanocobaltate catalyst made using tert-butyl alcohol as a complexing agent and made by homogenization (and containing less than 1 wt. % of crystalline DMC compound by X-ray analysis) is about 65% more active at 100 ppm, and 200% more active at 130–250 ppm, than the same catalyst made by simple mixing (and containing about 35 wt. % crystalline DMC compound). A consequence of higher polymerization rates is that polyol producers can use less of the relatively expensive DMC catalyst and save money. More active catalysts also permit the producer to reduce batch times and increase productivity.

The substantially amorphous catalyst compositions of the invention show a reduced induction period compared with conventional catalysts in a polyether polyol synthesis (see Table 3). Conventional DMC catalysts are not immediately active toward epoxide polymerization. Typically, a starter polyol, the catalyst, and a small amount of epoxide are combined and heated to the desired reaction temperature, and no epoxide polymerizes immediately. The polyol manufacturer must wait (often for several hours) until the catalyst becomes active and the charged epoxide begins to react before additional epoxide can safely be continuously added to the polymerization reactor. The substantially amorphous catalysts of the invention are more rapidly activated than conventional catalysts that contain up to 35 wt. % of crystalline DMC compound. This feature of the catalysts is also an economic advantage because delays in adding the epoxide are reduced.

Polyether polyols prepared using the catalysts of the invention have exceptionally low unsaturations, consistently less than about 0.007 meq/g. These unsaturations are at least about 50% lower than polyol unsaturations available from the DMC catalysts previously known (see Table 4). Preferred polyols of the invention have unsaturations less than about 0.006 meq/g, and more preferably less than about 0.005 meq/g. The reduction in unsaturation compared with polyols previously available from conventional DMC catalysts should offer some advantages for polyurethanes made with the polyols of the invention.

Polyether polyols made with the catalysts of the invention preferably have average hydroxyl functionalities from about 2 to 8, more preferably from about 2 to 6, and most preferably from about 2 to 3. The polyols preferably have number average molecular weights within the range of about 500 to about 50,000. A more preferred range is from about 1,000 to about 12,000; most preferred is the range from about 2,000 to about 8,000.

Polyols prepared with the catalysts of the invention also have substantially lower levels of low molecular weight polyol impurities compared with polyols prepared with conventional catalysts. Gel permeation chromatography (GPC) analysis of these polyols shows no detectable low molecular weight polyol impurities. In contrast, conventional DMC catalysts made in the usual way with glyme as a complexing agent show a marked GPC peak corresponding to about 5–10 wt. % of a low molecular weight polyol impurity.

Interestingly, polyols made with the catalysts of the invention are usually clearer than polyols made with conventional glyme catalysts; the former typically remain clear even after weeks of storage at room temperature, while the latter tend to quickly develop a haze during storage.

Another advantage of the substantially amorphous catalysts of the invention is that they are more easily removed from polyether polyols following polyol synthesis compared with conventional DMC compounds. The problem of how to remove DMC compounds from polyether polyols has been the subject of many investigations (see, for example, U.S. Pat. Nos. 5,144,093, 5,099,075, 5,010,047, 4,987,271, 4,877,906, 4,721,818, and 4,355,188). Most of these methods irreversibly deactivate the catalyst.

The catalysts of the invention can be isolated by simply filtering the polyol. Another way to isolate the catalyst is to first dilute the polyol with a solvent such as heptane to reduce viscosity, then filter the mixture to recover the catalyst, and then strip the polyol/heptane mixture to obtain the purified polyol. The methods described in U.S. Pat. No. 5,010,047 can also be used to recover the catalysts of the invention from polyols. An advantage of the catalysts of the invention is that they can be removed cleanly from polyols even with a hot filtration in the absence of any solvent. In contrast, when a polyol made with a conventional glyme catalyst is hot-filtered, substantial amounts of the DMC compound remain in the polyol. If desired, the isolated catalyst composition of the invention can be recovered and reused to catalyze another epoxide polymerization reaction because these simple filtration methods do not generally deactivate the catalysts.

The following examples merely illustrate the invention. Those skilled in the art will recognize many variations that are within the spirit of the invention and scope of the claims.

EXAMPLE 1

Preparation of Zinc Hexacyanocobaltate Catalysts by Homogenization Tert-butyl Alcohol as the Complexing Agent (Catalyst D)

Potassium hexacyanocobaltate (8.0 g) is added to deionized water (150 mL) in a beaker, and the mixture is blended with a homogenizer until the solids dissolve. In a second beaker, zinc chloride (20 g) is dissolved in deionized water (30 mL). The aqueous zinc chloride solution is combined with the solution of the cobalt salt using a homogenizer to intimately mix the solutions. Immediately after combining the solutions, a mixture of tert-butyl alcohol (100 mL) and deionized water (100 mL) is added slowly to the suspension of zinc hexacyanocobaltate, and the mixture is homogenized for 10 min. The solids are isolated by centrifugation, and are then homogenized for 10 min. with 250 mL of a 70/30 (v:v) mixture of tert-butyl alcohol and deionized water. The solids are again isolated by centrifugation, and are finally homogenized for 10 min with 250 mL of tert-butyl alcohol. The catalyst is isolated by centrifugation, and is dried in a vacuum oven at 50° C. and 30 in. (Hg) to constant weight. This catalyst is identified as Catalyst D, and has the powder X-ray diffraction pattern shown in FIG. 5.

EXAMPLE 2

Preparation of Zinc Hexacyanocobaltate Catalysts by Homogenization Isopropyl Alcohol as the Complexing Agent (Catalyst E)

The procedure of Example 1 is modified as follows. Isopropyl alcohol is substituted for tert-butyl alcohol. Following combination of the zinc chloride and potassium hexacyanocobaltate solutions and homogenization in the presence of isopropyl alcohol, the catalyst slurry is filtered through a 0.45 micron filter at 20 psi. The washing steps of Example 1 are also repeated, but filtration rather than centrifugation is used to isolate the catalyst. The washed catalyst is dried to constant weight as described above. The catalyst is identified as Catalyst E.

COMPARATIVE EXAMPLE 3

Preparation of Zinc Hexacyanocobaltate Catalysts by Simple Mixing Tert-butyl Alcohol as the Complexing Agent (Catalyst B)

The procedure of Japanese Pat. Appl. Kokai No. 4-145123 is generally followed. Potassium hexacyanocobaltate (4.0 g) is added to deionized water (75 mL) in a beaker, and the mixture is stirred until the solids dissolve. In a second beaker, zinc chloride (10 g) is dissolved in deionized water (15 mL). The aqueous zinc chloride solution is combined with the solution of the cobalt salt using a magnetic stirring bar to mix the solutions. Immediately after combining the solutions, a mixture of tert-butyl alcohol (50 mL) and deionized water (50 mL) is added slowly to the suspension of zinc hexacyanocobaltate, and the mixture is stirred for 10 min. The solids are isolated by centrifugation, and are then stirred for 10 min. with 100 mL of a 70/30 (v:v) mixture of tert-butyl alcohol and deionized water, The solids are again isolated by centrifugation, and are finally stirred for 10 min with 100 mL of tert-butyl alcohol. The catalyst is isolated by centrifugation, and is dried in a vacuum oven at 500° C. and 30 in. (Hg) to constant weight. This catalyst is identified as Catalyst B, and has the powder X-ray diffraction pattern shown in FIG. 3.

COMPARATIVE EXAMPLE 4

Preparation of Zinc Hexacyanocobaltate Catalysts by Simple Mixing Isopropyl Alcohol as the Complexing Agent (Catalyst C)

The procedure of Comparative Example 3 is followed, except that isopropyl alcohol is used in place of tert-butyl alcohol, and the solids are isolated by filtration using a 0.8 micron filter rather than by centrifugation. The catalyst is isolated and dried as described above. This catalyst is identified as Catalyst C.

COMPARATIVE EXAMPLE 5

Preparation of Crystalline Zinc Hexacyanocobaltate No Complexing Agent (Catalyst A)

Potassium hexacyanocobaltate (4.0 g) is dissolved in deionized water (150 mL) in a beaker. Zinc chloride (10 g) is dissolved in deionized water (15 mL) in a second beaker. The aqueous solutions are quickly combined and magnetically stirred for 10 min. The precipitated solids are isolated by centrifugation. The solids are reslurried in deionized water (100 mL) for 10 min. with stirring, and are again recovered by centrifugation. The catalyst is dried in a vacuum oven at 50° C. and 30 in. (Hg) to constant weight. This catalyst is identified as Catalyst A, and has the powder X-ray diffraction pattern shown in FIG. 4.

EXAMPLE 6

Epoxide Polymerizations: Rate Experiments— General Procedure

A one-liter stirred reactor is charged with polyoxypropylene triol (700 mol. wt.) starter (70 g) and zinc hexacyanocobaltate catalyst (0.057 to 0.143 g, 100–250 ppm level in finished polyol, see Table 2). The mixture is stirred and heated to 105° C., and is stripped under vacuum to remove traces of water from the triol starter. The reactor is pressurized to about 1 psi with nitrogen. Propylene oxide (10–11 g) is added to the reactor in one portion, and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (490 g) is added gradually over about 1–3 h at a constant pressure of 20–24 psi. After propylene oxide addition is complete, the mixture is held at 105° C. until a constant pressure is observed. Residual unreacted monomer is then stripped under vacuum from the polyol product, and the polyol is cooled and recovered.

Figure 1:
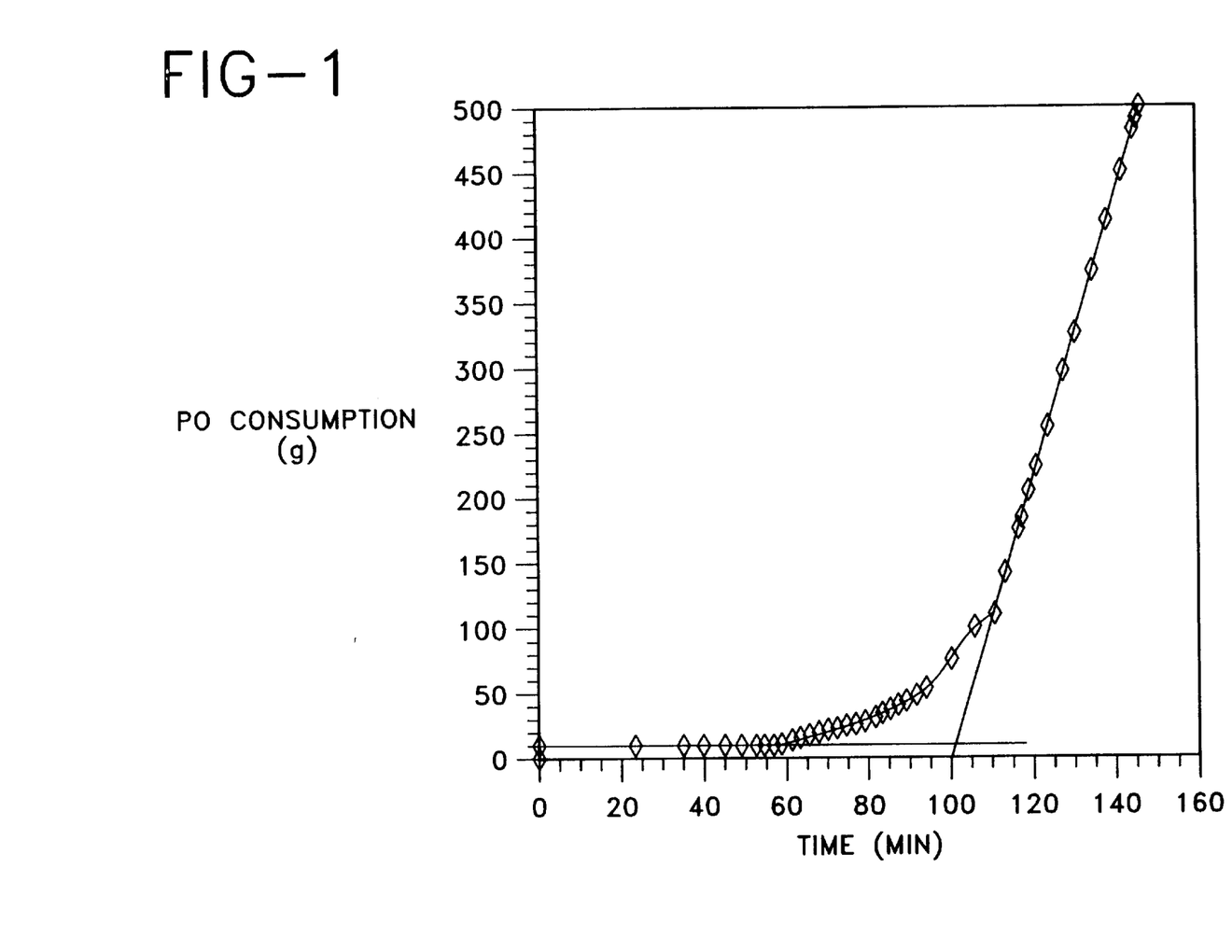
FIG. 1 shows a plot of propylene oxide consumption versus time during a polymerization reaction with one of the catalyst compositions of the invention at 250 ppm catalyst. The induction time for the run is measured as discussed in Example 6 from the intersection of the extended baseline and slope measurements.

To determine reaction rate, a plot of PO consumption (g) vs. reaction time (min) is prepared (see FIG. 1). The slope of the curve at its steepest point is measured to find the reaction rate in grams of PO converted per minute. The intersection of this line and a horizontal line extended from the baseline of the curve is taken as the induction time (in minutes) required for the catalyst to become active. The results of reaction rates and induction times measured for various catalysts at 100–250 ppm catalyst levels appear in Tables 2 and 3.

EXAMPLE 7

Polyether Polyol Synthesis: Effect of Catalyst on Polyol Unsaturation, Catalyst Removal, and Polyol Quality A two-gallon stirred reactor is charged with polyoxypropylene trio (700 mol. wt.) starter (685 g) and zinc hexacyanocobaltate catalyst (1.63 g). The mixture is stirred and heated to 105° C., and is stripped under vacuum to remove traces of water from the triol starter. Propylene oxide (102 g) is fed to the reactor, initially under a vacuum of 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (5713 g) is added gradually over about 2 h while maintaining a reactor pressure less than 40 psi. After propylene oxide addition is complete, the mixture is held at 105° C. until a constant pressure is observed. Residual unreacted monomer is then stripped under vacuum from the polyol product. The hot polyol product is filtered at 100° C. through a filter cartridge (0.45 to 1.2 microns) attached to the bottom of the reactor to remove the catalyst. Residual Zn and Co are quantified by X-ray analysis.

Polyether diols (from polypropylene glycol starter, 450 mol. wt.) and triols are prepared as described above using zinc hexacyanocobaltate catalysts made by conventional methods (stirring) and by the method of the invention (homogenization). The impact of the catalysts of the invention on epoxide polymerization rate (Table 2), induction period (Table 3), polyol unsaturation (Table 4), catalyst removal (Table 5), and polyol quality (Table 6) are shown in the tables.

EXAMPLES 8–11

Preparation of Zinc Hexacyanocobaltate Catalyst: Tert-Butyl Alcohol Present During Formation of the DMC Compound A round-bottom flask equipped with mechanical stirrer, addition funnel, and thermometer is charged with distilled water, potassium hexacyanocobaltate, and tert-butyl alcohol (See Table 7 for amounts). The mixture is stirred until all of the potassium salt dissolves. The resulting solution is heated to 30° C. To the stirred solution is added a 50/50 (wt/wt) solution of zinc chloride in water over 50 min (see Table 7). Stirring continues for another 30 min. at 30° C. The resulting white suspension is filtered under pressure at 30 psig. An 8.0 g portion of the filter cake is resuspended with vigorous stirring in a solution of tert-butyl alcohol (110 g) and water (60 g). After all of the solids are completely suspended in the wash solution, stirring continues for 30 min. The mixture is filtered as described above. The entire filter cake is resuspended in 99.5% tert-butyl alcohol (144 g), and is isolated as described above. The filter cake is dried at 45° C. overnight under vacuum. The catalyst is used to prepare a polyoxypropylene triol having a molecular weight of about 6000 and a hydroxyl number of about 28 mg KOH/g generally using the procedure of Example 7, but on a smaller scale with a propoxylated glycerin starter triol (hydroxyl number 240 mg KOH/g) and a catalyst level of 250 ppm in the final polyol. The unsaturations of the polyols appear in Table 7.

COMPARATIVE EXAMPLE 12

Preparation of Zinc Hexacyanocobaltate Catalyst: Tert-Butyl Alcohol Added After Formation of the DMC Compound The procedure of Examples 8–11 is generally followed, but is modified as described below. Tert-butyl alcohol is not added initially; the reactor is charged with water and potassium hexacyanocobaltate (see Table 7 for amounts). After the aqueous zinc chloride solution is added, the tert-butyl alcohol is added, and the mixture is stirred for 30 min. at 30° C. The catalyst is then isolated, dried, and used to prepare a polyether triol as described previously (See Table 7).

The results of Examples 8–11 and Comparative Example 12 show the lower polyol unsaturations available from using a catalyst made by the process of the invention with tert-butyl alcohol initially present during precipitation of the catalyst.

EXAMPLES 13 and 14

Effect of Order of Addition of Reactant Solutions on Catalyst Activity Tert-Butyl Alcohol Added During Formation of the DMC Compound

EXAMPLE 13

Solution 1 is prepared by dissolving zinc chloride (75 g) in tert-butyl alcohol (50 mL) and distilled water (275 mL). Solution 2 is prepared by dissolving potassium hexacyanocobaltate (7.5 g) in distilled water (100 mL). Solution 3 is prepared by mixing tert-butyl alcohol (2 mL) and distilled water (200 mL).

Solution 2 is added to solution 1 over 30 min. with homogenization. Mixing by homogenization continues for an additional 10 min. A stir bar is added. Solution 3 is added, and the mixture is slowly stirred magnetically for 3 min. The mixture is filtered under pressure at 40 psig. The filter cake is reslurried in tert-butyl alcohol (130 mL) and distilled water (55 mL), and the mixture is homogenized for 10 min. The mixture is filtered as described before. The cake is reslurried in neat tert-butyl alcohol (185 mL), and is homogenized for 10 min. The mixture is filtered, and the cake is dried under vacuum at 60° C. Yield: 8.6 g. The catalyst is used to polymerize propylene oxide as described in Example 6. The rate of polymerization at 105° C. and 10 psig at 100 ppm catalyst is 26.3 g PO/min.

EXAMPLE 14

Solution 1 is prepared by dissolving potassium hexacyanocobaltate (7.5 g) in distilled water (300 mL) and tert-butyl alcohol (50 mL). Solution 2 is prepared by dissolving zinc chloride (75 g) in distilled water (75 mL). Solution 3 is prepared from tert-butyl alcohol (2 mL) and distilled water (200 mL).

Solution 2 is added to solution 1 over 30 min. with homogenization. Mixing by homogenization continues for an additional 10 min. A stir bar is added. Solution 3 is added, and the mixture is slowly stirred magnetically for 3 min. The mixture is filtered under pressure at 40 psig. The catalyst is isolated, washed, and dried as described in Example 13. The catalyst is used to polymerize propylene oxide as described in Example 6. The rate of polymerization at 105° C. and 10 psig at 100 ppm catalyst is 15.6 g PO/min.

The results from Examples 13 and 14 show the effect of reversing the order of addition of reagents in a process of the invention. The results show the unexpectedly higher catalyst activity available from a catalyst made by adding the metal cyanide salt solution to the metal salt solution.

The preceding examples are meant only as illustrations. The scope of the invention is defined by the claims.

TABLE 1

DMC Catalyst Characterization

| ID | Catalyst | X-Ray Diffraction Pattern (d-spacings, angstroms)[1] | | | | | | Surface area[4] (m$^2$/g) |
|---|---|---|---|---|---|---|---|---|
| | | 5.07 | 4.82 | 3.76 | 3.59 | 2.54 | 2.28 | |
| A | Cryst. Zn—Co[2] | X | absent | absent | X | X | X | 454 |
| B | TBA stirred[2] | X | X | X | X | X | X | 82 |
| C | IPA stirred[2] | X | absent | X | X | X | X | n.m. |
| D | TBA homog.[3] | absent | X | X | absent | absent | absent | 14 |
| E | IPA homog.[3] | absent | X | X | absent | absent | absent | n.m. |

X = X-ray diffraction line present; n.m. = not measured.
Samples were analyzed by X-ray diffraction using monochromatized CuKα$_1$ radiation (λ = 1.54059 Å). A Seimens D500 Kristalloflex diffractometer powered at 40 kV and 30 mA was operated in a step scan mode of 0.02° 2θ with a counting time of 2 seconds/step. Divergence slits of 1° in conjunction with monochrometer and detector apertures of 0.05° and 0.15° respectively. Each sample was run from 5° to 70° 2θ.
[1]Water of hydration can cause minor variations in measured d-spacings.
[2]Comparative example.
[3]Catalyst of the invention.
[4]Surface area is measured by nitrogen adsorption using the standard BET method.

TABLE 2

Effect of Catalyst on Epoxide Polymerization Rate (105° C.)

| ID | Catalyst | Cat. amt. (ppm) | Rate of polymerization (g/min) |
|---|---|---|---|
| F | glyme[1,2] | 250 | 3.50 |
| | | 130 | 1.78 |
| | | 100 | 1.46 |
| B | TBA stirred[2] | 250 | 3.64 |

TABLE 2-continued

Effect of Catalyst on Epoxide Polymerization Rate (105° C.)

| ID | Catalyst | Cat. amt. (ppm) | Rate of polymerization (g/min) |
|---|---|---|---|
|  |  | 130 | 2.50 |
|  |  | 100 | 2.29 |
| D | TBA homog.[3] | 250 | 10.5 |
|  |  | 130 | 7.40 |
|  |  | 100 | 3.84 |
| C | IPA stirred[2] | 250 | <0.3 |
| E | IPA homog.[3] | 250 | 1.70 |

[1]Catalyst F is prepared as described in U.S. Pat. No. 5,158,922.
[2]Comparative example.
[3]Catalyst of the invention.

TABLE 3

Effect of Catalyst on Induction Period (105° C.)

| ID | Catalyst | Catalyst concentration (ppm) | Induction Time (min) |
|---|---|---|---|
| F | glyme[1,2] | 100 | 230 |
|  |  | 250 | 180 |
| B | TBA stirred[2] | 100 | 220 |
|  |  | 130 | 180 |
|  |  | 250 | 90 |
| D | TBA homog.[3] | 100 | 140 |
|  |  | 130 | 130 |
|  |  | 250 | 85 |

[1]Catalyst F is prepared as described in U.S. Pat. No. 5,158,922.
[2]Comparative example.
[3]Catalyst of the invention.

TABLE 4

Effect of Catalyst on Polyol Unsaturation

| ID | Catalyst | Polyol OH # (mg KOH/g) and functionality | Solvent | Polyol unsaturation (meq/g) |
|---|---|---|---|---|
| F | glyme[1,2] | 54 (Triol) | none | 0.016 |
|  |  | 27 (Triol) | none | 0.017 |
|  |  | 15 (Triol) | none | 0.019 |
| B | TBA stirred[2] | 35 (Triol) | none | 0.011 |
|  |  | 27 (Triol) | none | 0.010 |
|  |  | 14 (Triol) | none | 0.011 |
| D | TBA homog.[3] | 27 (Triol) | none | 0.005 |
|  |  | 56 (Diol) | none | 0.004 |
|  |  | 27 (Diol) | none | 0.005 |
|  |  | 14 (Diol) | none | 0.004 |
|  |  | 31 (Triol) | THF | 0.003 |
|  |  | 12 (Triol) | heptane | 0.006 |

[1]Catalyst F is prepared as described in U.S. Pat. No. 5,158,922.
[2]Comparative example.
[3]Catalyst of the invention.

TABLE 5

Effect of Catalyst on Catalyst Removal

| ID | Catalyst | Polyol OH # (mg KOH/g) and functionality | Filtration Temp. (° C.) | Solvent | Residual catalyst (ppm) Zn | Co |
|---|---|---|---|---|---|---|
| F | glyme[1,2] | 27 (Triol) | 100 | none | 28 | 12 |
| B | TBA stirred[2] | 25 (Triol) | 100 | none | 6 | 3 |
| D | TBA homog.[3] | 25 (Triol) | 100 | none | 5 | <2 |
|  |  | 14 (Diol) | 100 | none | 4 | <2 |
|  |  | 29 (Diol) | 100 | none | 3 | <2 |
|  |  | 14 (Triol) | 100 | none | 4 | <2 |
|  |  | 27 (Triol) | 25 | heptane | 3 | <2 |
|  |  | 14 (Diol) | 25 | heptane | 6 | <2 |

[1]Catalyst F is prepared as described in U.S. Pat. No. 5,158,922.
[2]Comparative example.
[3]Catalyst of the invention.

TABLE 6

Effect of Catalyst on Polyol Purity and Clarity

| ID | Catalyst | Low Mol. Wt. Polyol Impurity (Wt. %, by GPC) | Appearance (25° C., after 3 weeks) |
|---|---|---|---|
| F | glyme | 5–10 | hazy |
| D | TBA | none detected | clear |

TABLE 7

Preparation of DMC Catalysts with Tert-Butyl Alcohol Initially Present and Unsaturations of Polyether Triols (28 OH#) Made from the Catalysts

| Ex. # | Water (g) | Potassium hexacyano-cobaltate (g) | tert-Butyl Alcohol (g) | Zinc chloride (50%) (g) | Polyol unsaturation (meq/g) |
|---|---|---|---|---|---|
| 8 | 435 | 15 | 15 | 30 | 0.0027 |
| 9 | 302 | 7.4 | 39 | 152 | 0.0035 |
| 10 | 430 | 5.0 | 5.0 | 40 | 0.0032 |
| 11 | 393 | 15 | 15 | 121 | 0.0030 |
| C12 | 264 | 24 | 24 | 192 | 0.0072 |

We claim:

1. A polyether polyol having a nominal hydroxyl functionality of at least 3, mostly secondary hydroxyl groups, and an unsaturation less than about 0.007 meq/g.

2. The polyether polyol of claim 1 wherein the polyol is a polyoxypropylene polyol or an ethylene oxide-propylene oxide copolymer.

3. The polyether polyol of claim 1 having an unsaturation less than about 0.005 meq/g.

4. The polyether polyol of claim 1 having an unsaturation less than about 0.004 meq/g.

* * * * *